United States Patent

[11] 3,611,823

| [72] | Inventors | Elmer A. Richards<br>Oshtemo Township, Kalamazoo County;<br>Edward L. Zahn, Galesburg, both of Mich. |
|---|---|---|
| [21] | Appl. No. | 843,386 |
| [22] | Filed | July 22, 1969 |
| [45] | Patented | Oct. 12, 1971 |
| [73] | Assignee | Eaton Yale & Towne Inc.<br>Cleveland, Ohio |

[54] FLOATING MAIN DRIVE GEAR ASSEMBLY
11 Claims, 4 Drawing Figs.

[52] U.S. Cl. .................................................. 74/331,
74/410, 192/67 R
[51] Int. Cl. ...................................................... F16h 3/08,
F16h 57/00, F16d 11/00
[50] Field of Search............................................ 74/331,
410; 192/67

[56] References Cited
UNITED STATES PATENTS

| 2,936,655 | 5/1960 | Peterson et al. ................ | 74/410 X |
| 3,144,790 | 8/1964 | Davis, Jr. et al. .............. | 74/410 X |
| 3,188,888 | 6/1965 | Zink et al. ...................... | 74/410 X |
| 3,213,713 | 10/1965 | Sagara............................ | 74/410 X |
| 3,237,472 | 3/1966 | Perkins et al. ................. | 74/331 |
| 3,309,936 | 3/1967 | Gaubis .......................... | 74/410 |
| 3,335,616 | 8/1967 | Perkins.......................... | 74/331 |
| 3,500,695 | 3/1970 | Keiser ........................... | 74/331 |

*Primary Examiner*—Carlton R. Croyle
*Assistant Examiner*—Thomas C. Perry
*Attorney*—Woodhams, Blanchard and Flynn ABSTRACT: A transmission, particularly of the multiple countershaft type, having the input or main drive gear floatably mounted for free axial rocking movement relative to both the input shaft and to the transmission main shaft to compensate for axial misalignment therebetween as said drive gear is connected alternately directly to said main shaft or to ratio gears.

INVENTORS
ELMER A. RICHARDS
EDWARD L. ZAHN

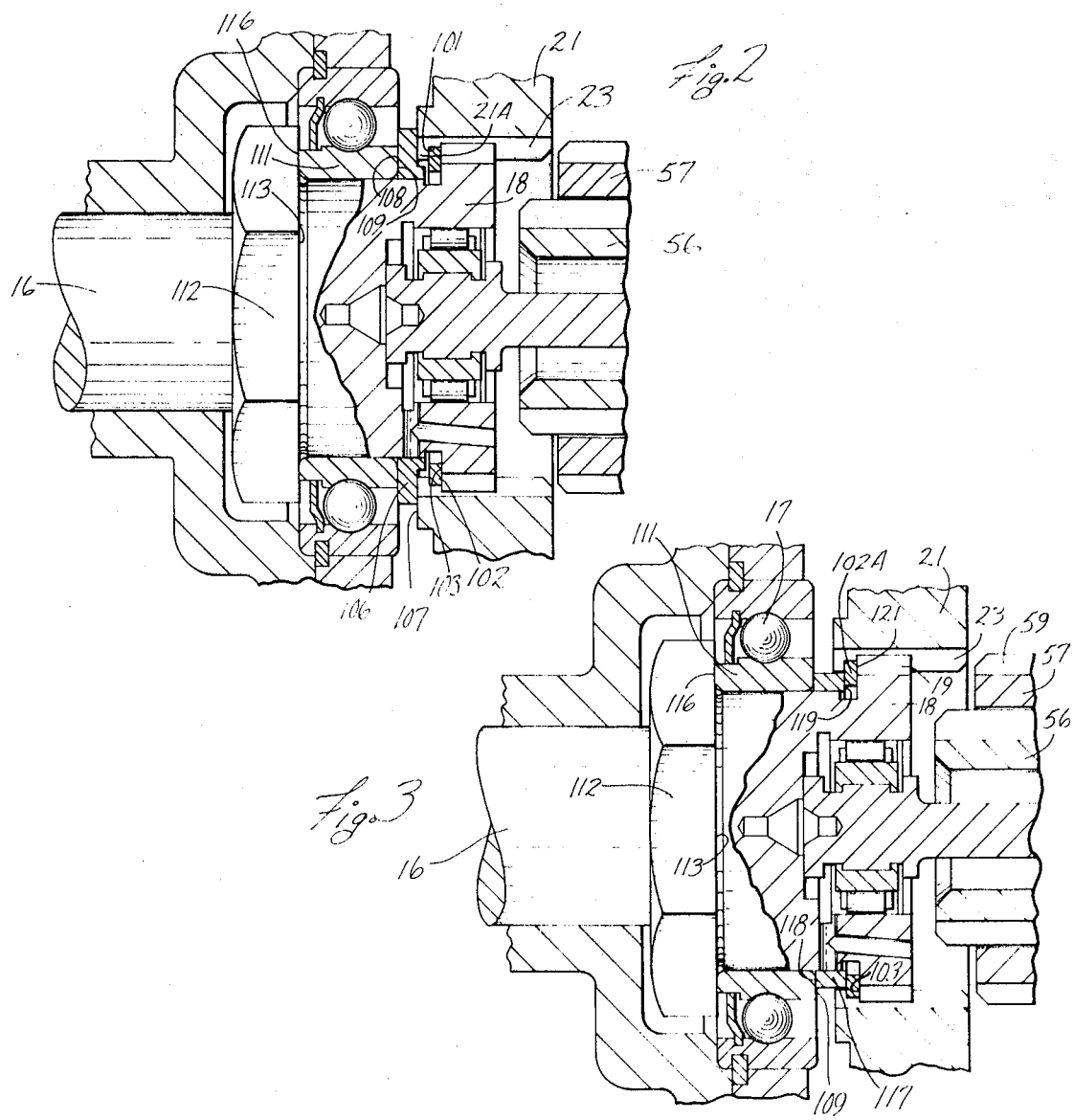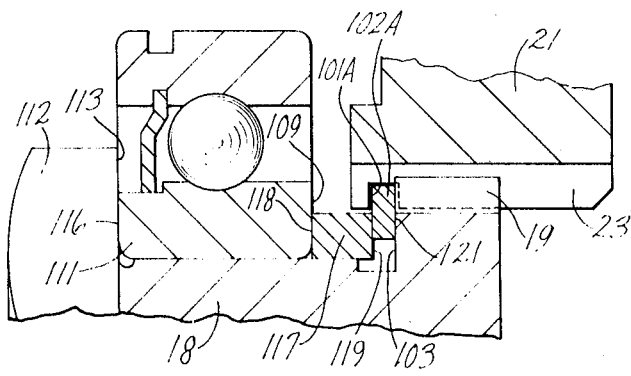

FLOATING MAIN DRIVE GEAR ASSEMBLY

FIELD OF THE INVENTION

This invention relates to a transmission and, in particular, to a multicountershaft transmission wherein the input or main drive gear is mounted for free axial rocking movement relative to both the input shaft and the transmission main shaft.

BACKGROUND OF THE INVENTION

In most transmissions, particularly heavy-duty transmissions of the automotive type, the input or main drive gear of the transmission is generally fixedly or integrally secured on or relative to the extending end of the input shaft. The transmission input shaft is substantially coaxially aligned with the transmission main shaft and is adapted to be directly drivingly connected thereto by means of a shiftable clutch sleeve slideably mounted on the main shaft and adapted to drivingly engage the main drive gear, which main drive gear is generally provided with internal teeth for permitting same to be meshingly engaged with the shiftable clutch sleeve. However, perfect alignment between the engine housing and transmission housing is difficult to achieve and maintain and thus a small amount of relative misalignment nearly always occurs between the input shaft and the transmission main shaft. This misalignment, while normally falling within acceptable manufacturing tolerances, often causes the input shaft to run askew with respect to the transmission main shaft. The misalignment or askew relationship also exists between the input gear and the shiftable clutch sleeve since the clutch sleeve is snugly but slideably mounted on the main shaft, whereas the input gear is normally fixedly, or at least concentrically, secured relative to the input shaft.

Due to such relative misalignment between the input shaft and the transmission main shaft, meshing engagement between the clutch sleeve and the input gear tends to cause the internal teeth of the input gear and the engaging teeth on the clutch sleeve to progressively wear at an angle so that the individual teeth assume a somewhat tapered configuration. This tapered wearing of the teeth is a result of in-and-out clutch tooth movement relative to the input gear teeth. That is, as the input shaft and transmission main shaft rotate, the misalignment therebetween causes a relative axial sliding or an in-and-out movement between the meshing teeth of the clutch sleeve and the input gear. This wear on the teeth of the clutch sleeve and input gear progresses until the teeth assume a tapered configuration. The taper or angle created by the wear introduces an axial force component due to the transmission of torque from the input gear to the clutch sleeve, which axial force component is sufficient in many cases to overcome the friction lock between the sliding clutch sleeve and the main shaft, thereby causing the clutch sleeve to be axially forced out of engagement with the input gear, commonly referred to as "slipout," thus causing an undesired disengagement in the direct drive from the input shaft to the transmission main shaft.

The above slipout condition has been observed to sometimes occur after as little as 50,000 miles of transmission operation. Such a slipout condition occurring after such relatively low mileage is especially undesirable in transmissions utilized on heavy-duty vehicles, such as trucks, since such vehicles generally utilize a transmission for several hundred thousand miles. This undesirable slipout condition thus requires that the transmission be periodically repaired, requiring a replacement of both the input gear and the shiftable clutch sleeve engageable therewith. Such repairs are obviously undesirable since such maintenance is not only expensive, but also requires that the vehicle, such as a truck, be withdrawn from usable service for at least the time required to obtain repairs.

The relative misalignment which occurs between the input shaft and the transmission main shaft has also been observed to create additional wear within the transmission when the transmission is of the multiple countershaft type, particularly when the transmission is a twin countershaft transmission having a pair of countershaft gears in continuous meshing engagement with the input gear at diametrically opposite sides thereof. The countershafts of a transmission can be quite accurately aligned relative to the transmission main shaft since they are all mounted within a common transmission housing. However, due to the relative misalignment or askewed relationship often occurring between the transmission main shaft and the input shaft, the input shaft is also frequently misaligned or positioned in an askewed relationship relative to the transmission countershafts. Thus, since the input gear is fixedly secured relative to the input shaft, the input gear is thus frequently positioned in an askewed or misaligned relationship relative to the pair of countershaft gears in continuous meshing engagement therewith. This askewed relationship thus often results in concentration of loading at the ends of the teeth with resulting pitting, increased wear and sometimes breakage of the teeth of the input gear and countershaft gears engaged therewith, all resulting in shortened life for such gears and consequent shortening of the useful life of the transmission containing same.

Accordingly, it is an object of this invention to provide:

1. A transmission, particularly a multicountershaft transmission, having an input gear adapted to be meshingly engaged by a shiftable clutch sleeve with the input gear being mounted for free axial rocking movement.

2. A transmission, as aforesaid, wherein the input gear is nonrotatably secured on the end of an input shaft and is mounted for axial rocking movement relative thereto.

3. A transmission, as aforesaid, wherein the input gear has internal teeth thereon adapted to be meshingly engaged by external teeth formed on a shiftable clutch sleeve nonrotatably secured to a transmission main shaft positioned adjacent the input shaft.

4. A transmission, as aforesaid, wherein the mounting of the input gear permits same to axially rock relative to both the input shaft and relative to the transmission main shaft to compensate for misalignment therebetween.

5. A transmission, as aforesaid, wherein the input gear is in continuous meshing engagement with a pair of countershaft gears positioned adjacent diametrically opposite sides thereof, the axial rocking movement of the input gear permitting same to achieve a balanced position when in driving engagement with said countershaft gears for permitting optimum loading of the gear teeth.

6. A transmission, as aforesaid, wherein the input gear is axially secured to the input shaft by means of a retainer ring which is received within an annular groove formed in the input gear, the annular groove having an axial width at least slightly greater than the width of the retainer ring for permitting the input gear to have limited axial rocking movement relative to the input shaft.

7. A transmission, as aforesaid, wherein the free axial rocking movement of the input gear results in a substantial increase in the maintenance-free operational periods and useful life of the transmission.

8. A transmission, as aforesaid, requiring less maintenance and repair and thus possessing a higher degree of reliability in operation.

Other objects and purposes of this invention will be apparent to persons acquainted with apparatus of this general type upon reading the following specification and inspecting the accompanying drawings.

BRIEF DESCRIPTION OF THE DRAWINGS

FIG. 2 is an enlarged fragmentary sectional view of the input gear portion of FIG. 1 illustrating a conventional manner of fixedly mounting the input gear on the end of the input shaft, which mounting arrangement often results in the slipout problem as described above.

FIG. 3 is a fragmentary sectional view similar to FIG. 2 but illustrating the improved input gear mounting means according to the present invention for permitting at least limited axial rocking movement of the input gear.

FIG. 4 is an enlarged fragmentary sectional view of a portion of FIG. 3, particularly illustrating the mounting of the input gear.

Figure 1:
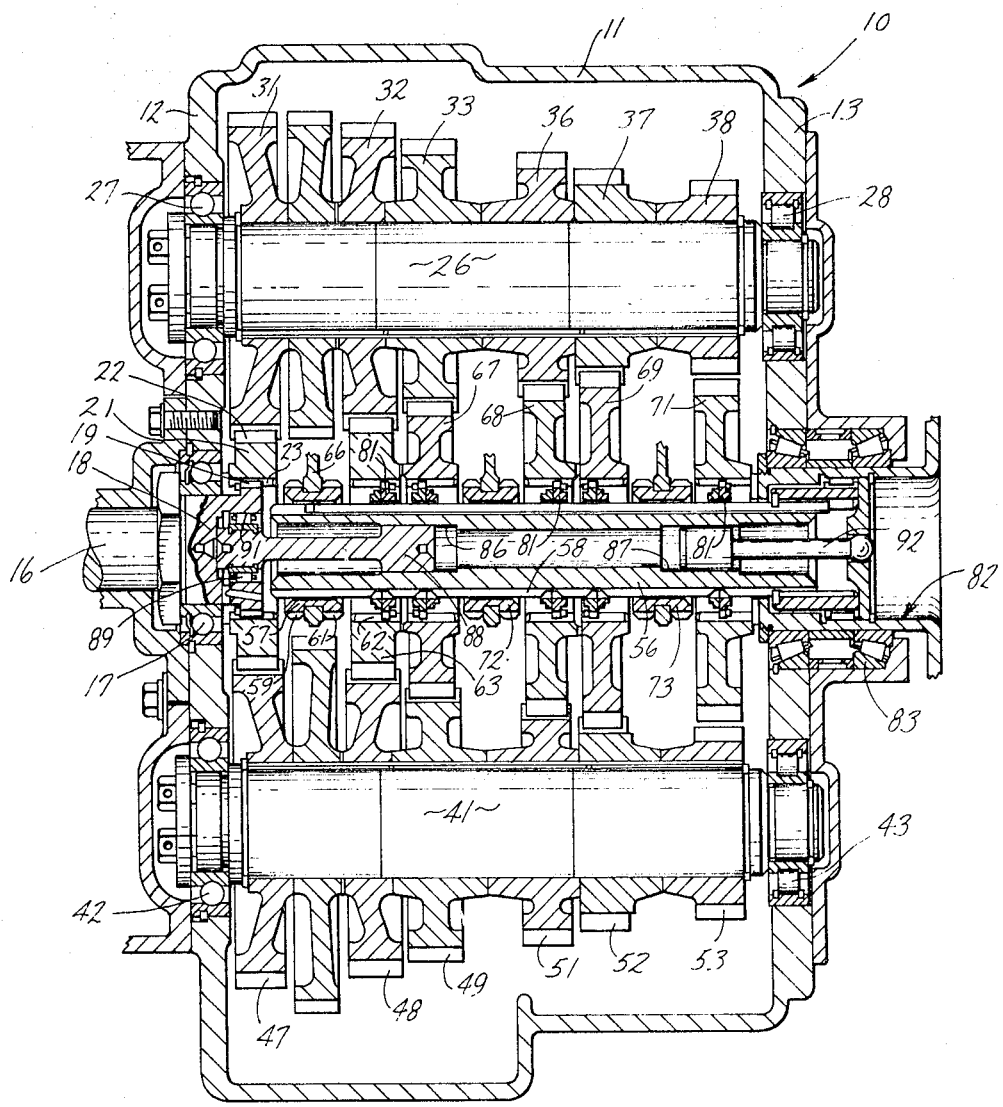
FIG. 1 is a fragmentary central sectional view through both countershafts and the main shaft of a two-countershaft transmission.

Certain terminology will be used in the following description for convenience and reference only and will not be limiting. The words "upwardly," "downwardly," "rightwardly" and "leftwardly" will designate directions in the drawings to which reference is made. The terms "forward" and "rearward" will refer to directions forward and rearward of the vehicle in which the transmission is installed. Thus, the leftward portion of the transmission as appearing in FIGS. 1–4 is forward and the rightward portion as appearing in said figures is rearward. The terms "inward" and "outward" will refer to directions toward and away from the geometric center of the apparatus and designated parts thereof. Said terminology will include the words above specifically mentioned, derivatives thereof and words of similar import.

SUMMARY OF THE INVENTION

In general, the objects and purposes of this invention are met by providing a transmission, particularly a multicountershaft transmission, having at least two similar countershafts having substantially identical sets of countershaft gears thereon and, in one preferred embodiment, arranged on diametrically opposite sides of the transmission main shaft, which main shaft is in said embodiment substantially coaxially aligned with an input shaft. The input shaft has an input or main driving gear nonrotatably mounted on the end thereof, which input gear is in continuous meshing engagement with a pair of diametrically opposite countershaft gears. The input gear is also adapted to be meshingly engaged with a slideable clutch sleeve which is nonrotatably mounted on the adjacent end of the transmission main shaft, the clutch sleeve being slideable axially of the main shaft to permit meshing engagement with the input gear. The input gear is preferably provided with internal teeth which are meshingly engaged by similar external teeth formed on the shiftable clutch sleeve to permit direct drive between the input shaft and the transmission main shaft. The input gear is mounted on the end of the input shaft by means which permit the input gear to have limited axial rocking movement relative to the input shaft and thereby enable it to align itself coaxially with whichever of the main shaft or the countershaft gears it is at a given moment in engagement. Thus, in either case, there will be achieved optimum uniformity in loading between the teeth of the input gear and the teeth engaged under load therewith.

DETAILED DESCRIPTION

In general, the transmission embodiment shown in the drawings and selected to illustrate the present invention is described in detail in U.S. Pat. No. 3,237,472. However, a description of the transmission comprising the environment of the present invention is set forth hereinafter for purposes of convenience in reference.

Referring to FIG. 1, there is illustrated a transmission 10 having a casing 11 which has a forward end wall 12 and a rearward end wall 13. An input shaft 16 extends through end wall 12 being supported by a bearing 17, and has an enlarged head 18 formed on the rearward end thereof. The head 18 has external splines 19 and carries thereon the input or main drive gear 21. Said drive gear 21 has external teeth 22 and internal clutch teeth 23, the latter being in meshing engagement with the splines 19.

A first countershaft 26 is supported on end walls 12 and 13 by bearings 27 and 28 and carries thereon and fixed for rotation therewith the countershaft ratio gears 31, 32, 33, 36, 37 and 38. A second countershaft 41 is supported on end walls 12 and 13 by bearings 42 and 43 and is in all respects preferably identical with the first countershaft 26. Second countershaft ratio gears 47, 48, 49, 51, 52 and 53 are mounted on and for rotation with the second countershaft 41 and are preferably respectively identical with the ratio gears 31, 32, 33, 36, 37 and 38. The countershaft gears 31 and 47 are in constant mesh with the input gear 21 adjacent diametrically opposite sides thereof.

The transmission main shaft 56 is arranged substantially coaxial with the input shaft 16 and may be resiliently supported. Gears are provided encircling the main shaft for constant engagement with and support by the countershaft gears and said countershaft gears and/or said main shaft gears are appropriately clutched, to each other or to their respective shafts, in any convenient manner to provide driving connections from the two countershafts through a selected pair of countershaft gears to and through the main shaft gear associated therewith to the main shaft.

In the illustrated embodiment, a clutch sleeve 57 is slidingly mounted on the forward end of said main shaft 56 on splines 58 and carries external clutch teeth 59 which are engageable with the internal clutch teeth 23 of the input gear 21 upon leftward movement of said clutch sleeve 57. Clutch sleeve 57 also carries clutch teeth 61 which engage suitable internal clutch teeth 62 in a main shaft gear 63 upon rightward movement of the clutch sleeve 57. The gear 63 is meshed with and carried by the countershaft gears 32 and 48. Said clutch sleeve 57 is provided with any suitable means for effecting axial movement thereof, such as by the usual grooves and shift fork 66.

Further main shaft gears 67, 68, 69 and 71 are supported between and by associated pairs of countershaft gears and are drivingly engageable with main shaft 56 by means of clutch sleeves 72 and 73 as explained in detail in the above-mentioned U.S. Pat. No. 3,237,472.

Axial movement of the several main shaft gears may be prevented by any convenient and conventional device, such as the devices 81 (described in detail in U.S. Pat. No. 3,237,472). These devices will prevent axial movement of the main shaft gears but will not in any way interfere with movement of the main shaft gears in any radial direction with respect to the main shaft 56. Thus, the gear 63, for example, is in no degree or sense supported on or by the shaft 56 and the device 81 functions only to prevent axial motion of said gear 63 with respect to said shaft 56.

An output unit 82 is rotatably mounted in a bearing 83 provided in rear wall 13 of the transmission casing. As here shown, said output unit 82 is a hollow shaft provided with a flange for affixing thereto any suitable driven means, such as universal joint means, but it will be recognized that it may also be the input gear of an auxiliary transmission arranged serially with respect to the transmission unit herein illustrated and described. Said output unit 82 is driven by the main shaft 56 in any convenient manner, as explained in detail in above-mentioned U.S. Pat. No. 3,237,472.

Considering now the mounting of the main shaft 56, same is provided with end recesses 86 and 87, the recess 86 tightly receiving therein one end of a rod-shaped hanger 88, the other end of said hanger being enlarged and being received within a bearing structure 89 which is positioned within an internal opening 91 formed in the end of the input shaft 16. A generally similar mounting is provided on the other end of the main shaft wherein a further rodlike hanger 92 extends into the recess 87 with the outer or rightward end of hanger 92 being mounted in any convenient manner for radial rigidity, but preferably slight angular movement on and with respect to output unit 82.

The mounting of main shaft 56 is described in greater detail in above-mentioned U.S. Pat. No. 3,237,472. This mounting arrangement causes output unit 82 and main shaft 56 to rotate together while permitting main shaft 56 to have a substantial amount of freedom of radial movement in any direction with respect to the axis of the output unit 82 and with respect to the input shaft 16.

Considering now in greater detail the manner in which the input gear 21 is mounted on the enlarged portion 18 of the input shaft 16, the input gear 21 is provided (FIG. 2) with an annular groove 101 formed in the internal teeth 23 thereof, which annular groove receives an annular snap ring or retainer member 102 therein. The retainer ring 102 is adapted to abut against a forward abutment surface 103 formed on the enlarged end portion 18 to prevent rearward axial movement (rightward movement in FIG. 2) of the input gear 21 relative to the input shaft 16. Forward movement of the input gear (leftwardly in FIG. 2) relative to the input shaft is prevented by means of an L-shaped retainer ring 106, which ring bears against the forward face 107 of the input gear 21. The forward face 108 of the retainer ring 106 in turn bears against the rearward face 109 of the inner race 111 of the ball bearing assembly 17, which inner race in turn tightly bears at its forward face 116 against a nut 112 threadably and fixedly secured to the input shaft 16.

The rearward surface 113 of nut 112 and the forward surface 103 of enlarged end portion 18 thus define a pair of substantially parallel, spaced abutment surfaces having tightly confined therebetween the inner ball bearing race 111, the L-shaped retainer 106, a portion of the internal teeth of the input gear, and the retainer ring 102. This mounting arrangement thus tightly and axially fixedly secures the input gear 21 relative to the input shaft 16 and thus prevents any linear and/or rocking axial movement of the input gear relative to the input shaft. While this mounting arrangement does operate in a satisfactory manner, it often results in a tapered wearing of the internal teeth 23 of the input gear 21, thereby resulting in a slipout problem as explained above.

The transmission structure as described above, and in particular the mounting of the input gear as illustrated in FIG. 2, is substantially conventional, being illustrated and described in greater detail in the above-mentioned U.S. Pat. No. 3,237,472.

Considering now the manner in which the input gear 21 is mounted for axial rocking movement relative to the input shaft 16 in accordance with the present invention, such mounting structure is illustrated in detail in FIGS. 3 and 4. The parts identified in FIGS. 3 and 4 with the same numerals as those appearing in FIGS. 1 and 2 are identical therewith and the description of them does not need to be repeated. However, in the device of the invention, the rearward face 109 (rightward end in FIG. 3) of the inner race 111 in turn abuts the front face 118 of an annular washer 117 which surrounds a portion of the enlarged portion 18 of the input shaft 16. The annular washer 117 has an outside diameter less than the internal diameter of the internal teeth 23 formed on the input gear 21 and a length sufficient to enable it to extend into the cylindrical space defined by the internal teeth 23. The rearward axial end face 119 of the washer 117 abuts the retainer ring 102A, which retainer ring 102A is received within an annular groove 101A (FIG. 4) formed within the internal teeth 23. The rearward axial end face 121 of the retainer ring 102A in turn abuts the support surface 103 formed on the enlarged portion 18.

Thus, as best illustrated in FIG. 4, the inner race 111, the annular washer 117 and the retainer ring 102A completely occupy and are positioned in abutting contact with one another between the support faces 103 and 113, both of which faces are fixedly secured relative to the input shaft 16. This is thus contrary to the prior art construction illustrated in FIG. 2 wherein the portion 21A of the input gear 21 was also rigidly confined between the two supporting surfaces 103 and 113.

The groove 101A formed within the internal teeth 23, unlike corresponding groove 101, has an axial width sufficiently, though only slightly, greater than the axial width of the retainer ring 102A (FIG. 4) so as to provide a limited axial clearance therebetween. This limited axial clearance thus permits the input gear 21 to move axially relative to the input shaft 16, either linearly or angularly, due to the external load applied thereto. Thus, the input gear 21, due to the clearance between the retainer ring 102A and its associated groove 101A, can rock or move angularly in an axial plane relative to the input shaft 16 to properly align with the clutch sleeve 57 when same is in meshing engagement with the input gear 21, thereby compensating for any misalignment or askewed relationship between the input shaft 16 and the transmission main shaft 56 or between the input shaft and the countershafts 26 and 47.

While the amount of axial clearance (that is, groove 101A axial width minus retainer ring 102A axial width) is obviously a variable which depends both upon the relative size of the input gear and retainer ring and the expected misalignment between the input shaft and the transmission main shaft, in relationship to the amount of desired input gear angular movement, it has been found that providing an axial clearance of 0.003 to 0.005 inch does result in sufficient axial rocking movement to permit the input gear 21 to properly align with the shiftable clutch sleeve 57 when in engagement therewith or to properly align with the countershaft gears when driving through them. However, it will be recognized that the amount of clearance can be increased, if necessary, to permit greater angular movement of the input gear relative to the input shaft if a greater amount of angular movement is desired or found necessary.

OPERATION

The operation of the device embodying the invention will be described in detail hereinbelow for a better understanding thereof.

Input power from the input shaft 16 is supplied to the input gear 21 and is then delivered to the countershafts 26 and 41 due to the continuous meshing engagement between the input gear 21 and the countershaft gears 31 and 47. By suitable manipulation of one of the shift forks, one of the main shaft gears, such as the gear 63, is engaged with the main shaft 56 so that power is then conducted from the two countershafts to the main shaft.

When power is being transmitted to the main shaft 56 from the countershafts 26 and 41, as by means of the teeth 61 on the clutch sleeve 57 being in meshing engagement with the internal teeth 62 of the main shaft gear 63, torque will be transmitted from the input gear 21 to the pair of countershafts gears 31 and 47. Since the input gear is mounted by means of the groove 101A and retainer ring 102A for axial rocking movement relative to the input shaft 16, the input gear 21 will be substantially supported by and between the two diametrically opposite countershaft gears 31 and 47. Accordingly, the input gear will align itself so that its axis is parallel to the axes of the countershaft gears 31 and 47 and the misalignment will be relieved by relative axial motion between the input gear and the input shaft rather than by relative axial motion between the teeth of the input gear and the teeth of the countershaft gears engaged therewith. Thus, the tooth loading on said gears will be axially uniform which will provide for uniform wear, minimize stresses, pitting and deflection and thereby maximize the life of the gears.

When it is desired to transmit torque directly from the input shaft 16 to the transmission main shaft 56, the clutch sleeve 57 will be moved axially forwardly (leftwardly in the drawings) by the shift fork 66 so that the external clutch teeth 59 will meshingly engage the internal teeth 23 formed on the input gear 21. Since a small amount of misalignment generally exists between the input shaft 16 and the main shaft 56, the transmission of torque from the input gear 21 to the clutch sleeve 57 due to the meshing engagement therebetween will effect a rocking of the input gear on its shaft and an alignment of the input gear and the main shaft now engaged therewith.

Such rocking of the input gear 21 when same engages the shiftable clutch sleeve 57 is possible because the input gear 21 is not now truly supported by the pair of countershaft gears 31 and 47 due to the fact that the countershaft gears are being driven in an idle condition and no appreciable torque is being transmitted from the input gear to the countershafts (the torque transmitted to the countershafts being just sufficient to drive the countershafts and overcome the friction involved in driving same). Thus, the countershaft gears 31 and 47 are unable to restrain axial rocking movement of the input gear 21 and same will thus axially rock relative to the input shaft 16 so as now to substantially align itself with the transmission main shaft 56, whereby the motion resulting from misalignment will continue to appear as relative movement between the input gear and the input shaft rather than between the teeth 23 of the input gear and the teeth 59 of the clutch.

When the clutch sleeve 57 is again moved rearwardly so as to disengage the input gear 21, whereby torque is again transferred from the input shaft to the countershafts, the torque transmission from the input gear 21 to the pair of supporting countershaft gears 31 and 47 will again cause the input gear 21 to axially rock back into alignment with said countershaft gears so as to again bear axially uniformly against them.

While only one structural means has been disclosed for permitting axial rocking movement of the input gear relative to the input shaft, it will be recognized that numerous mounting devices could be utilized for permitting such axial rocking movement of the input gear so as to achieve the beneficial advantages of the present invention.

Tests with apparatus of the invention have shown that the invention essentially cures the slipout condition above described. With the invention, operations as high as 250,000 miles have been experienced before repair has been required, and even then the repair was usually of some part of the transmission other than that involved in said slipout.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which I claim an exclusive property or privilege are defined as follows:

1. A change speed gear transmission, comprising:
   a plurality of spaced countershafts having parallel axes and means supporting said countershafts for rotation;
   a plurality of sets of countershaft gears mounted on said countershafts, each set comprising one gear on each of the countershafts and the gears of each set being substantially identical;
   drive means for rotating said countershafts at substantially identical speeds and in the same direction, said drive means comprising an input gear meshed with a set of countershaft gears, an input shaft in direct driving contact with said input gear and means mounting said input gear nonrotatably with respect to said input shaft;
   a rotatable main shaft arranged substantially parallel with said countershafts and located therebetween and means supporting said main shaft for rotation, said main shaft being substantially axially aligned with said input shaft;
   a plurality of drive gears encircling said main shaft, each of said drive gears being adapted to be meshed with a set of countershaft gears;
   clutch means for selectively establishing at least one driving connection between said input shaft, countershafts and said main shaft through a set of countershaft gears and a selected drive gear
   or establishing a direct driving connection between said input shaft and said main shaft, said clutch means including a movable clutch element shiftable axially relative to said input shaft for permitting said input gear to be drivingly interconnected to said main shaft; and
   means providing relative axial movement between said input gear and said input shaft.

2. A transmission according to claim 1, wherein said means providing relative axial movement between said input gear and said input shaft comprises a coupling member for linking said input shaft and said input gear for permitting axial rocking movement of said input gear relative to said input shaft.

3. A transmission according to claim 2 including means for restraining the input shaft from axial movement and wherein said means providing relative axial movement between said input gear and said input shaft permits axial rocking movement of said input gear relative to said input shaft.

4. A transmission according to claim 2, wherein said movable clutch element comprises a clutch sleeve nonrotatably mounted on said main shaft, said clutch sleeve being axially slideably mounted on said main shaft for permitting same to be moved into clutching engagement with said input gear.

5. A transmission according to claim 4, wherein said input gear has external teeth thereon in continuous meshing engagement with said set of countershaft gears, said input gear further having internal teeth thereon adapted to be engaged by a set of corresponding external teeth formed on said shiftable clutch sleeve.

6. A transmission according to claim 4, wherein said input gear has an annular groove formed on the internal periphery thereof, and said connecting means including an annular retainer ring positioned within said groove and means axially fixedly positioning said retainer ring relative to said input shaft, said annular retaining ring having an axial width less than the axial width of said groove for permitting said input gear to axially rock relative to said input shaft.

7. A transmission according to claim 12, wherein the axial width of said groove exceeds the axial width of said retainer ring by at least 0.003 inch.

8. A drive connection, comprising:
   a first rotatable input shaft means;
   a second rotatable main shaft means disposed substantially in axial alignment with said input shaft means;
   a plurality of spaced countershafts disposed in parallel relation to said input and main shafts;
   a plurality of sets of countershaft gears, each set being substantially identical and mounted on one of said plurality of countershafts; input gear means in meshing relationship with a corresponding gear of each of said sets of countershaft gears and in meshing contact with said input shaft.
   at least one main shaft gear in meshing relationship with corresponding gears in each of said sets of countershaft gears,
   clutch means for selectively establishing a direct drive relationship between said input gear and said main shaft or establishing an alternative driving relationship between said input gear and said main shaft via said countershaft gears, countershafts and said main shaft gear and means providing relative axial movement between said input gear and said input shaft whereby the axis of said input gear substantially aligns with the axis of the main shaft in response to said direct drive relationship and substantially aligns with the axes of said countershafts in response to said alternative drive relationship.

9. A drive connection according to claim 8 wherein said clutch means comprises a clutch sleeve nonrotatably mounted on said main shaft, said clutch sleeve being axially slideable on said main shaft for movement into clutching engagement with said input gear.

10. A drive connection according to claim 9, wherein said input gear has an annular groove formed on the internal periphery thereof, and said means providing relative axial movement between said input gear and said input shaft includes an annular retainer ring positioned within said groove and means axially fixedly positioning said retainer ring relative to said input shaft; said annular retaining ring having an axial width less than the axial width of said groove for permitting said input gear to axially rock relative to said input shaft.

11. A drive connection, comprising:
   a first rotatable shaft means;
   second rotatable shaft means disposed substantially in axial alignment with said first shaft means;
   clutch means for selectively permitting said second shaft means to be directly drivingly interconnected to said first shaft means;

said clutch means including first and second toothed elements supported on said first and second shaft means, respectively, said first and second toothed elements having corresponding teeth thereon adapted to meshingly engage for permitting said first and second shaft means to be drivingly interconnected;

first mounting means for nonrotatably securing said first toothed element to said first shaft means;

second mounting means for nonrotatably securing said second toothed element to said second shaft means; and said first mounting means providing linear and angular axial relative movement between said first and second toothed elements and said first shaft means to insure an aligned connection between said first and second shaft means in response to said driving interconnection thereof, wherein said first mounting means includes an annular groove and an annular ringlike retainer member positioned within said groove and retainer member being axially fixed relative to said first shaft means, the other of said groove and retainer member being axially fixed relative to said first toothed member, and said groove having an axial width greater than the axial width of said retainer member for permitting said first toothed member to rock axially relative to said first shaft means.